United States Patent [19]
Otani

[11] 3,774,937

[45] Nov. 27, 1973

[54] SAFETY SEAT BELT
[75] Inventor: Syuichi Otani, Tokyo, Japan
[73] Assignee: Nissan Motor Company Limited, Yokohama City, Japan
[22] Filed: June 5, 1972
[21] Appl. No.: 259,769

[30] Foreign Application Priority Data
   Sept. 13, 1971   Japan................................ 46/82614

[52] U.S. Cl......................... 280/150 SB, 280/150 B
[51] Int. Cl. ............................................ B60r 21/10
[58] Field of Search..................... 280/150 B, 150 SB

[56] References Cited
UNITED STATES PATENTS
3,682,498   8/1972   Rutzki............................ 280/150 SB
2,025,822   12/1935  Pryor............................. 280/150 B
3,650,542   3/1972   Shimano.......................... 280/150 B
2,236,540   2/1966   Berton........................... 280/150 SB Primary Examiner—Robert R. Song
Attorney—John Lezdey

[57] ABSTRACT

A seat which may be part of a motor vehicle is equipped with a safety seat belt which is adapted to protect a seat occupant from being flung out of the seat through restraint of the seat occupant not only at his laps or thighs, chest and shoulder but at his head and neck during collision condition of the motor vehicle. The seat belt thus includes, in addition to the usual lap belt and shoulder strap, a flexible strip which is arranged to be ready to be stretched in front of the occupant's head and neck when the seat is subjected to an excessive deceleration as in the case of the collision of the motor vehicle. The flexible strip is usually held in a folded condition on the shoulder strip or the lap belt.

9 Claims, 10 Drawing Figures

SAFETY SEAT BELT

The present invention relates to vehicle safety devices and, more particularly, to safety seat belts adapted for the restraint of seat occupants such as those of vehicles in which due to sudden accelerations relative to the seats the seat occupants are subject to forces toward propulsion from the seats. While being applicable seats for mobile objects or structures, it will be herein assumed that the present invention is applied to the seats of motor vehicles, for purposes of illustration.

It is presently one of the mandatory requirements in many of the countries to have the seats of the motor vehicles equipped with safety seat belts to provide some sort of restraint for the seat occupants for the purpose of protecting the occupants from injury in the event the motor vehicle encounters a collision during cruising. Among the known motor vehicle seat belts is a lap belt which is intended to protect the seat occupant from being flung from the seat through restraint of the occupant at his laps or thighs. Another version of the known seat belts is a combination lap belt and shoulder strap safety device having a lap belt to restrain the seat occupant's laps or thighs and one or two shoulder straps which are adapted to receive the seat occupant at his torso and shoulder. While these prior art seat belts for partial body restraint have been effective for certain types of relatively minor accelerations of the occupants arising from the collision of the motor vehicle, they have proved unsatisfactory for the purpose of protecting the occupants head from striking against the relatively stationary structures such as the instrument panel, steering wheel and windshield during the collision condition of the motor vehicle. The fact is, however, that the occupant's head is subject to an acceleration with a considerable magnitude due to the spring actions of the belt elements such as the lap belt and shoulder strap and is thus liable to serious dangers. If an arrangement is made so that restraint is provided for the occupant's neck carrying the head, then a fatal danger will be imposed on the occupant, let alone the technical difficulties envoloved to put such arrangement into practice. Only an expansible protector bag arrangement, the construction and operation of which are well known in the art has been successful insofar as the requirement for protecting the occupant's head is to be fulfilled. Provision of such protector bag arrangement, however, results in other drawbacks in that the expanded protector bag constitutes an obstruction to the driver's frontal viewing and in that the driver restrained by the expanded protector bag is disabled to properly control the motor vehicle.

The present invention contemplates resolution of all these drawbacks which have thus far been inherent in the prior art safety seat belts for the mobile objects and structures.

It is, therefore, an object of the present invention to provide an improved safety seat belt which is adapted to restrain the seat occupant not only at his laps or thighs, chest and shoulders but his head and neck when the seat is subjected to an excessive deceleration, viz., the seat occupant undergoes an excessive acceleration such as during collision of the motor vehicle.

It is another object of the invention to provide an improved vehicle safety seat belt which is adapted to provide satisfactory restraint for the seat occupant during the collision condition of the vehicle without obstructing the driver's frontal viewing and preventing the driver from properly maneuver the vehicle during the collision condition.

It is still another object of the invention to provide an improved vehicle safety seat belt which is simple in construction, easy to manufacture and ready for being compactly installed in a limited working space such as the cabon of motor vehicle.

The safety seat belt achieving these and other objects of the present invention generally comprises, in combination, a lap belt extending over and across a seat portion of the seat, a shoulder strap which is anchored at one end to an intermediate portion of the lap belt and at the other to a suitable relatively stationary structure substantially above a seat back portion of the seat, this shoulder strap being located in a manner to extend across the seat occupant's torso, a flexible strip having a relatively lower portion fastened to a portion of the lap belt and said shoulder strap and usually held in a folded or collapsed condition on the portion of the lap belt and shoulder strap, at least one pliable line which is connected at one end to an upper end portion of the flexible strip, destructible retaining means for retaining the pliable line at its intermediate portion alongside the shoulder strap and destroyable when the seat is subjected to an excessive deceleration for releasing the pliable line from the retaining means, and spring means connected to the other end of the pliable line for thereby biasing the line toward a position in which the flexible strip is forced upwardly and stretched ahead of the occupant's head when the retaining means is destroyed in response to the excessive deceleration of the seat.

The nature and advantages of the safety seat belt in accordance with the present invention will become more apparent from the following description taken in conjunction with the accompanying drawings, in which.

Figure 1:
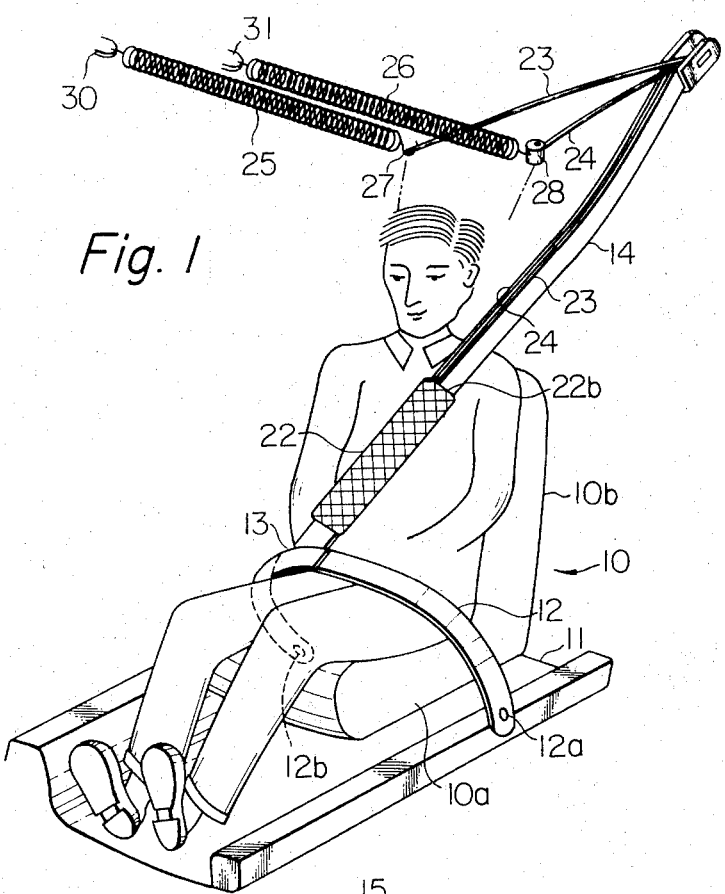
FIG. 1 is a perspective view showing an overall construction of the safety seat belt according to the present invention.

Reference will first made to FIG. 1 so as to depict the general construction of the safety seat belt embodying the present invention. As noted at an outset of this description, this safety seat belt is assumed to be mounted on a seat in a motor vehicle for illustrative purposes. This seat, designated by reference numeral 10, includes a generally horizontal seat portion 1a and a generally upright seat back portion 10b, as customary, and is held stationary relative to a floor pan 11 of the motor vehicle structure.

The safety seat belt includes, as shown, a cross or lap belt 12 which is secured at both ends to the floor pan 11 as at 12a and 12b and which extends over the seat portion 10a of the seat in such a manner that its crosses thighs or laps of a seat occupant carried on the seat 10. This lap belt 12 may be either a unitary member or may be made of two halves which are buckled or otherwise releaseably joined together as by an adjustable quick-release buckled connection 13. The safety seat belt further includes a generally vertical shoulder strap 14 which is connected at its lowermost end to an intermediate portion of the lap belt 12 through, for instance, the buckle connection 13 as shown. The shoulder strap 14 is directed substantially upwardly and backwardly of the seat back portion 10b of the seat 10 in a manner to extend across the seat occupant's chest and shoulder and is anchored at its leading end to a roof structure (not shown) of the cabin of the motor vehicle through an assembly of anchoring fittings.

Figure 2:
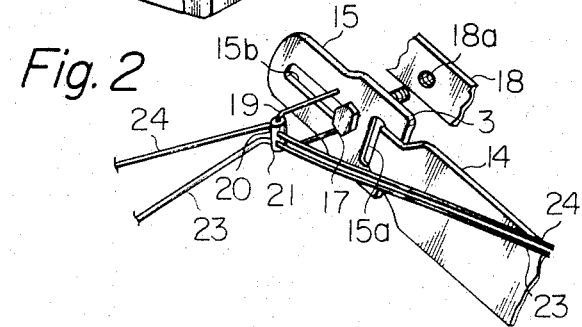
FIG. 2 is a fragmentary perspective view showing, on an enlarged scale, the destructible retaining means and associated elements forming part of the safety seat belt shown in FIG. 1.
Figure 3:
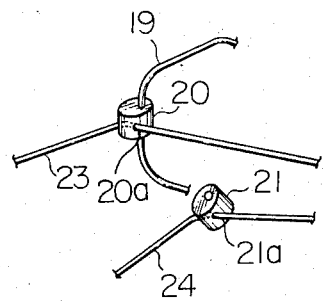
FIGS. 3 and 4 are also fragmentary perspective views showing, on a still enlarged scale, essential portions of the retaining means shown in FIG 2.
Figure 4:
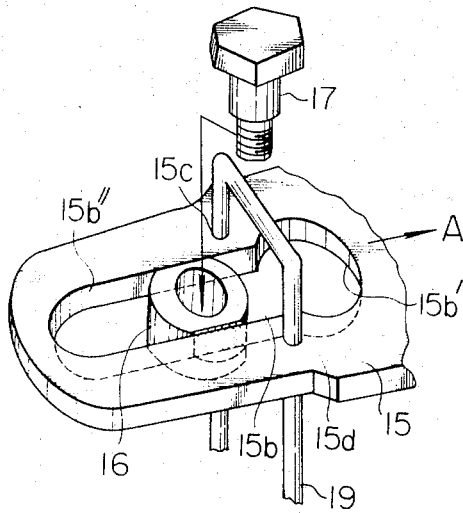

The detailed construction of this assembly of the anchoring fittings is illustrated in FIG. 2. Referring thus to FIG. 2, the assembly of the anchoring fittings includes an apertured link member 15 to which the shoulder strap 14 is securely anchored through a cross slot 15a formed in an end portion of the link member 15. The link member 15 has formed therein a longitudinally elongated slot 15b extending generally in line with the shoulder strap 14. As clearly seen in FIG. 3, this elongated slot 15b in the link member 15 comprises a generally rounded end portion 15b' located close to the shoulder strap 14 and a reduced, substantially straight portion 15b'' merging from the rounded portion 15b' and extending in a direction opposite to the shoulder strap 14. A plastic collar 16 is received in the rounded portion 15b' of this elongated slot 15b. The plastic collar 16, in turn, receives therein a stud or bolt 17 extending through the plastic collar 16 in a direction substantially perpendicular to the link member 15, as seen in FIG. 2. The bolt 17 is anchored to a support member 18 through a hole 18a formed therein. This support member 18 is fast on or integral with any structural member of the motor vehicle positioned substantially above and behind the seat back 10b of the seat 10. The assembly of the anchoring fittings further includes a destructible release wire 19 in a loop form which has its upper and lower parallel portions inserted into holes 15c and 15d formed in the link member 15 on both sides of the straight portion 15b'' of the elongated slot 15b so that its side portions extend substantially in parallel to the opposite faces of the link member 15. One of these side portions of the release wire 19 is located in close proximity to the bolt 17 and the other of them carries thereon two fitting elements 20 and 21 having formed therein holes 20a and 21a, respectively, each extending from one side of the fitting element to the other, as best seen in FIG. 4. The link member 15, plastic collar 16, bolt 17 and release wire 19 thus constitute the previously mentioned destructible retaining means.

Figure 5A:
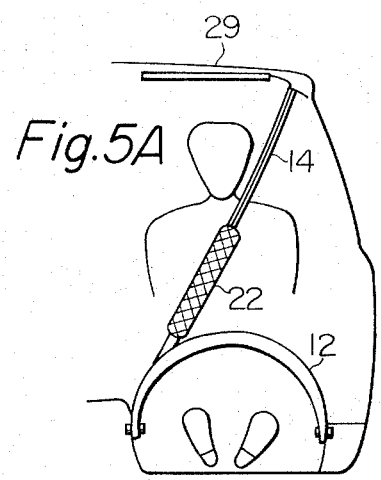
FIGS. 5A, 5B and 5C are front, side and top end views respectively of the safety seat belt of FIGS. 1 to 3 under an inoperative or loose condition.
Figure 6A:
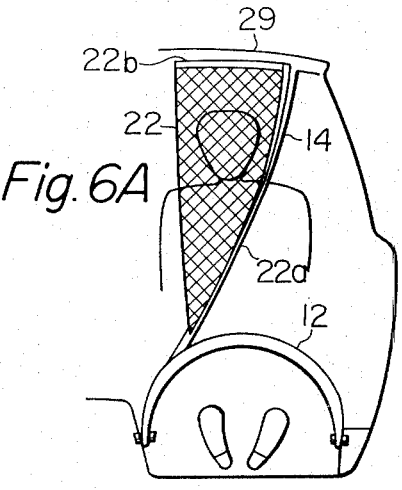
FIGS. 6A, 6B and 6C are similar to FIGS. 5A, 5B and 5C, respectively, showing the safety seat belt under an operative or protective condition.
Figure 5B:
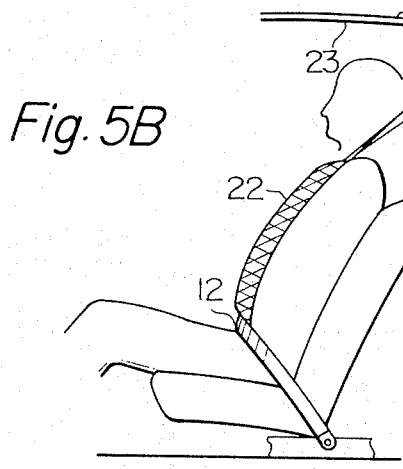
Figure 6B:
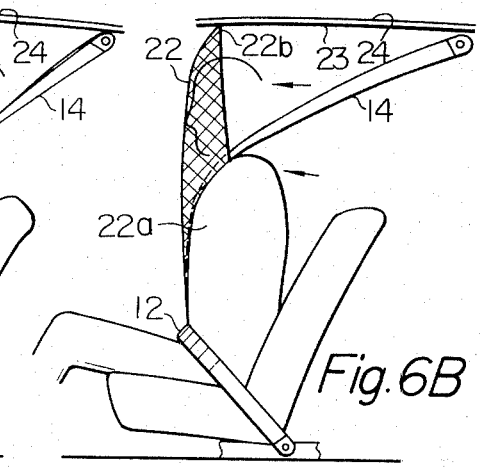
Figure 5C:
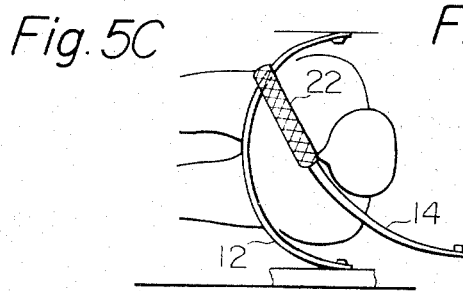

A flexible, stretchable strip 22 is located on the shoulder strap 14, as seen in FIG. 1. This flexible strip 22 is usually held in a folded or collapsed condition as seen in FIGS. 5A, 5B and 5C and has its longitudinal side end portion anchored as at 22a to an intermediate portion of the shoulder strap 14 as seen in FIGS. 6A and 6B. The flexible strip 22 may be made of a netting or a sheet of cloth which is adequately flexible or soft. Where the flexible strip 22 is to be made of cloth, the cloth may be transparent or at least semitransparent or of the porous nature so as not to obstruct the driver's frontal viewing when the flexible strip is stretched over the driver's head, as will be described later. A pair of pliable lines 23 and 24 are anchored each at one end to an upper end portions 22b of the flexible strip 22 and are passed alongside the shoulder strap 14 toward the assembly of the anchoring fittings including the link member 15, as seen in FIG. 1. These pliable lines 23 and 24 are passed through the holes 20a and 21a in the fitting elements 20 and 21, respectively, and are connected at their leading ends to pre-loaded tension springs 25 and 26 through guide member 27 and 28, respectively. These guide members 27 and 28 are located over and immediately in front of the seat back 10b of the seat 10 and are secured to any structural member such as the roof structure 29 (FIGS. 5A and 5B) of the motor vehicle. Also, the tension springs 25 and 26 are secured at their opposite ends to the structural member of the motor vehicle through hooks or eyebolts 30 and 31, respectively, as shown in FIG. 1. The pliable lines 23 and 24 are thus biased toward a position to extend immediately ahead of the occupant of the seat 10 as indicated by phantom lines in FIG. 1, although they are usually retained by the fitting elements 20 and 21, respectively, in the position illustrated in FIGS. 5A, 5B and 5C in which the flexible strip 22 is maintained in its folded or collapsed condition.

The flexible strip 22, pliable lines 23 and 24 and guide members 27 and 28 are positioned in such a manner that the flexible strip 22 is relocated in a stretched condition to a position facing the head and neck of the seat occupant on the seat 10.

With the safety seat belt according to the present invention constructed and arranged in this manner, the flexible strip 22 and pliable lines 23 and 24 are compactly combined with the shoulder strap 14 and are loosely in contact with the torso of the seat occupant when the seat belt is held under an inoperative condition which is illustrated in FIGS. 5A, 5B and 5C. The driver occupying the seat with the thus constructed seat belt is therefore permitted to steer and control the motor vehicle in similar conditions to those imposed where the seat is equipped with the prior art safety seat belt.

Figure 6C:
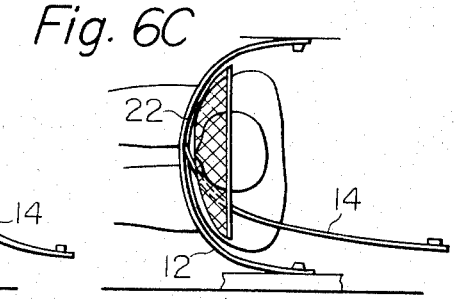

When, now, the seat 10 is subjected to an excessive deceleration and consequently the seat occupant undergoes an excessive deceleration as during collision condition of the motor vehicle, an increased tension is produced in the shoulder strap 14 by a force of inertia in the seat occupant which is flung away from the seat back 10b of the seat 10. This increased tension in the shoulder strap 14 causes the link member 15 to be forced toward the lap belt 12, viz., in a direction indicated by an arrow A in FIGS. 2 and 3. As a consequence, the plastic collar 16, which has been snugly received in the rounded portion 15b' of the elongated slot 15b in the link member 15, is forced to move into the reduced straight portion 15b'' of the elongated slot 15b with the result that the plastic collar 16 is diametrically buckled or otherwise its outer peripheral wall abutting the inner edges of the link member 15 is scrapped off by a stress caused therein as indicated in FIG. 3. The bolt 17 is thus permitted to advance away from the rounded portion 15b' of the elongated slot 15b and strikes against or presses upon the destructible release wire 19 called on the link member 15. The side portion of the release wire 19, which has been located at a proximity to the bolt 17 in the initial condition, is accordingly broken or sheared by the bolt 17 so that the release wire 19 is disconnected from the link member 15. This causes the pliable lines 23 and 24 to be relocated from the positions alongside the shoulder strap 14 to the positions extending over the head of the seat occupant on the seat 10. In this condition, the pliable lines 23 and 24 are pulled forcefully by the actions of the pre-loaded tension springs 25 and 26, respectively, whereupon the flexible strip 22 is caused to stretch immediately ahead of the occupant's head with its longitudinal side end portions secured to the shoulder strap 14 and its upper end portion raised over the top of the occupant's head, as seen in FIGS. 6A, 6B and 6C. The flexible strip 22 in this stretched condition is generally positioned in a plane constituted by the guide members 27 and 28 and the longitudinal side end portion of the flexible strip 22 anchored to the shoulder strap 14, thereby receiving or capturing the head and part of the chest of the seat occupant who is thrown thereto. Thus, the seat occupant is subject to a restraint not only at his laps or thighs and torso but at his head and neck in a reliable manner and is therefore protected from injury in the event of a collision of the motor vehicle. In spite of such restraint imposed on the seat occupant, the occupant is permitted to properly control the motor vehicle during the collision condition in the absence of an obstruction to the driver's frontal viewing as would be experienced where the expansible protector bag arrangement is used. The safety seat belt herein disclosed is, therefore, adapted to assure safety not only during the collision condition of the motor vehicle but during the condition posterior to the collision condition with the safety seat belt maintained in its protective position.

The safety seat belt which has thus far been described in the foregoing may be changed and modified in numerous manner insofar as the gist of the present invention is maintained. Although, for instance, the flexible strip has been described as anchored to the shoulder strap, such is merely for the purpose of illustration and, if desired, the flexible strip may be anchored at its lower end portion to the lap belt.

What is claimed is:

1. A safety seat belt for restraining a seat occupant at his laps, torso and head in the event the seat undergoes an excessive deceleration comprising, in combination, a lap belt extending over and across a seat portion of the seat, a shoulder strap which is anchored at one end to an intermediate portion of said lap belt and at the other to a relatively stationary structure substantially over a seat back portion of the seat, said shoulder strap being located in a manner to extend across the seat occupant's torso, a flexible strip having a relatively lower portion anchored to a portion of said lap belt and said shoulder strap and usually held in a collapsed condition which is ready to be stretched, at least one pliable line which is connected at one end to an upper end portion of said flexible strip, destructible retaining means for retaining said at least one pliable line at its intermediate portion alongside said shoulder strap and destroyable when the seat is subjected to said excessive deceleration for releasing said at least one pliable line from said retaining means, and spring means connected to the other end of said at least one pliable line for thereby biasing the line toward a position in which the flexible strip is forced upwardly and stretched ahead of the occupant's head when said retaining means is destroyed in response to said excessive deceleration.

2. A safety seat belt according to claim 1, in which said destructible retaining means comprises a link member to which said shoulder strap is connected at its leading end, said link member having formed therein an elongated slot consisting of a rounded portion close to said leading end of the shoulder strap and a substantially straight reduced portion merging from said rounded portion and extending in a direction opposite to said shoulder strap, a plastic collar received in said rounded portion, a bolt received in said plastic collar in a direction substantially perpendicular to said link member and secured to a relatively stationary structure positioned above and substantially behind the seat back of the seat, a destructible release wire in a loop form carried by said link member on both sides of said reduced portion of said elongated slot and having one side portion located at a close proximity to said bolt, and at least one fitting element carried by said release wire and carrying said at least one pliable line at its intermediate portion.

3. A safety seat belt according to claim 1, in which said flexible strip is anchored at its longitudinal side end portion to an intermediate portion of said shoulder strap.

4. A safety seat belt according to claim 1, in which said flexible strip is anchored at its lower end portion to an intermediate portion of said lap belt.

5. A safety seat belt according to claim 1, in which said flexible strip is made of a netting.

6. A safety seat belt according to claim 1, in which said flexible strip is made of a sheet of cloth.

7. A safety seat belt according to claim 6, in which said cloth is substantially transparent.

8. A safety seat belt according to claim 6, in which said cloth is of the porous nature.

9. A safety seat belt according to claim 1, further comprising at least one guide member through which said at least one pliable line is connected to said spring means and which is located substantially over the head of the seat occupant to occupy said seat.

* * * * *